Patented Dec. 20, 1938

2,140,992

UNITED STATES PATENT OFFICE 2,140,992

PROCESS FOR PREVENTING INCRUSTATION ON HEATING SURFACES DURING THE CONCENTRATION OF SULPHITE-CELLULOSE WASTE LIQUOR

Wilhelm Gensecke, Gonzenheim, near Frankfort-on-the-Main, Germany, assignor to American Lurgi Corporation, New York, N. Y., a corporation of New York No Drawing. Application February 24, 1936, Serial No. 65,538. In Germany March 6, 1935

4 Claims. (Cl. 252—7)

This invention relates to a process for preventing incrustation on heating surfaces during the concentration of sulphite-cellulose waste liquor.

In concentrating waste liquors from the manufacture of sulphite-cellulose, inconvenience is caused by the fact that the heating surfaces soon become incrusted, chiefly with gypsum. The removal of the incrustations by mechanical or chemical means is a tedious and expensive operation and up to the present no economical solution of the problem of preventing such incrustations has been discovered.

The process hereinafter described is based on the known fact that the solubility of gypsum in water diminishes as the temperature rises and that, consequently precipitation of gypsum can be obtained by the simple application of heat. It is therefore presumable that sulphite-cellulose waste liquor, which contains, in addition, other organic and inorganic constituents, behaves in a similar manner; and this is actually the case. However, if the gypsum content of a saturated sulphite-cellulose waste liquor be examined, and compared with the content in a saturated aqueous solution, it is found that, in the former case, the amount of gypsum present is about twenty times as great as in the case of water alone. Consequently, on heating the sulphite-cellulose waste liquor, very considerable amounts of gypsum would be thrown down. If, for example, the concentration ratio, calculated from saturation point, be 1:4, 75% of the 30 grms. per litre of incrustation formers present must be precipitated, which would require the application of heat to an extent out of question in practice.

It has now been unexpectedly ascertained in accordance with the present invention that only a small fraction (16–25%) of the amount of incrustation formers present in accordance with the degree of concentration,—that is to say, which would have to be precipitated in the circumstances—need to be thrown down in order to prevent any further deposition during the subsequent concentration. In order to precipitate 16–25% of incrustation formers, all that is necessary, in the case of an unsaturated crude liquor of about 5° Bé. strength is to heat said liquor to 170° C., prior to its introduction into the concentrating plant, this treatment preventing any deposition of gypsum in concentrating the liquor to 20% of its original volume. In the case of a liquor that has been concentrated to the saturation point of the dissolved incrustation formers, prior to being introduced into the concentration plant, heating to 160° C. is necessary for preventing incrustation during further concentration.

The reason for this apparently peculiar behavior of sulphite-cellulose waste liquor is to be found in the circumstance that the gypsum content is a function, not only of the temperature, but also of the concentration of the liquor, namely, that the gypsum content may be the higher the greater the concentration, that is to say, the lower the proportion of water in the liquor. This will be understandable when the fact is remembered that saturated sulphite-cellulose waste liquor may contain about 20 times as much gypsum in solution as is soluble in water. This is undoubtedly due to the presence of other constituents present, in addition to gypsum in the aqueous solution. If the percentage content of these substances be increased by preliminary concentration, the capacity of retaining gypsum in solution will also be increased.

The above described method of treatment requires only such an amount of heat as is needed to raise the solution to a temperature of 160–170° C., and this expenditure of heat is economicaly admissible. Moreover, nearly the whole of the heat can be utilized by allowing the liquor to cool, by expansion, after leaving the pressure-heating apparatus, and employing the steam, formed during the expansion, for heating the preliminary concentration apparatus, or for other purposes, in known manner.

Example I 1000 cc. of sulphite-cellulose waste liquor of 4.8° Bé. strength, were heated at 170° C. in an autoclave and then cooled down. The deposit amounted to 2.02 grms. Analysis of the liquor, prior to the heating showed a content of 17.2 grms. per litre of CaO+CaSO₄. After the heating, the liquor was concentrated to 156 cc., corresponding to 22° Bé. No precipitation occurred.

The same liquor was concentrated without any preliminary heating, the following results being obtained:

| Vol. cc. | °Bé. | Deposit, grams |
|---|---|---|
| 1000 | 4.8 | |
| 800 | 6.4 | |
| 600 | 8.3 | |
| 400 | 13.0 | 1.07 |
| 150 | 23.0 | 2.08 |

Expressed graphically, the deposition is seen to commence when the volume is reduced to 580 cc., and that, consequently, saturation is reached at that volume. Calculated from the saturation point, the degree of concentration is therefore 580/150.

Assuming constant solubility, the proportion of the 17.2 grms. of $CaO+CaSO_4$ that would have to be precipitated was $17.2 \times (580-150)/580 = 12.7$ grms. During the heating 2.02 grms. were deposited, i. e., 15.0% of 12.7 grms.

*Example II*

500 cc. of sulphite-cellulose waste liquor concentrated to 10° Bé., were heated at 160° C. in the autoclave. The deposit amounted to 1.8 grms. No further deposit ensued during further concentration to 180 cc.—corresponding to 22° Bé.

It may be remarked, in general, that the data given in the examples are applicable to sulphite-cellulose waste liquors of the character usual in practice, so that, in the case of variations, a corresponding tolerance, in respect of these values, must be taken into consideration.

In known processes for the heat treatment of sulphite-cellulose waste liquors, the heating is applied for a purpose that is entirely different from that of the process of the present invention. In the cases hitherto known, the object is either to neutralize the acidity of the waste liquor, or the recovery of the free sulphurous acid contained in the liquor, or again to carbonize the organic constituents and separate them mechanically from the liquor, without in the last case, aiming at any concentration at all.

The term incrustation formers is to be understood to include calcium sulphate and other constituents of sulphite-cellulose waste liquor which behave like gypsum. Wherever the word gypsum occurs in the appended claims it is to be understood to include those constituents of sulphite-cellulose waste liquor which behave like gypsum.

I claim:

1. A process for concentrating sulphite cellulose waste liquor without decomposition and without the formation of incrustations on the heat exchange surfaces of evaporators which comprises establishing a stationary pool of sulphite cellulose waste liquor containing an amount of incrustation-forming components including calcium products in excess of that soluble in the volume to which said liquor is to be evaporated, introducing steam into said stationary pool of liquor to heat said liquor to a temperature of about 160° to about 170° C., continuing said heating until about 16 to about 25% of said incrustation-forming components including calcium products is precipitated, transferring said heated liquor devoid of precipitated incrustation-forming components and containing about 75 to about 84% of said incrustation-forming components including calcium products originally present in said waste liquor to evaporators, and then evaporating said heated waste liquor devoid of precipitated components but containing about 75 to about 84% of the incrustation-forming components including calcium products originally present to a volume equal to about 0.25 of the volume of said liquor when saturated to incrustation forming components substantially without decomposition and without further precipitation of said components including calcium products on the heat exchange surfaces of said evaporators whereby concentrated cellulose sulphite waste liquor is produced substantially without reduction of the thermal efficiency of the evaporators.

2. A process for concentrating sulphite cellulose waste liquor without decomposition and without the formation of incrustations on the heat exchange surfaces of evaporators which comprises establishing a stationary pool of sulphite cellulose waste liquor containing large amounts of incrustation-forming components including calcium products, introducing steam into said stationary pool of waste liquor to heat said waste liquor to a temperature of about 160° to about 170° C., continuing said heating until about 16 to about 25% of said incrustation-forming components including calcium products is precipitated, transferring said heated liquor devoid of precipitated incrustation-forming components to evaporators, and then concentrating said waste liquor containing large amounts of incrustation-forming components to a volume considerably less than the volume at which said waste liquor is saturated to said incrustation-forming components without decomposition and without further precipitation of incrustation-forming components including calcium products whereby concentrated cellulose sulphite waste liquor is produced without reduction of the thermal efficiency of the evaporators.

3. A process for concentrating sulfite cellulose waste liquor without decomposition and without the formation of incrustations on the heat exchange surfaces of evaporators which comprises establishing a stationary pool of sulphite cellulose waste liquor containing an amount of incrustation-forming components including calcium products in excess of that necessary to saturate said waste liquor when concentrated to about 0.6 of the original volume, introducing steam into said stationary pool of waste liquor to heat said liquor to about 160° to about 170° C., continuing said heating until not more than about 25% of said incrustation-forming components is precipitated, separating said heated liquor from precipitated components, transferring said heated liquor containing at least about 75% of said incrustation-forming components to evaporators, and then concentrating said waste liquor containing said incrustation-forming components without decomposition of said liquor and without further precipitation of said incrustation-forming components to a volume considerably less than the volume at which said liquor is saturated to said incrustation-forming components whereby concentrated sulphite cellulose waste liquor is produced without reduction of the thermal efficiency of the evaporators.

4. A process for concentrating sulphite cellulose waste liquor without decompositon and without the formation of incrustations on the heat exchange surfaces of evaporators which comprises establishing a stationary pool of sulphite cellulose waste liquor containing incrustation-forming components including calcium products, said calcium products being present in amounts when calculated as CaO and $CaSO_4$ much greater than that amount necessary to saturate said liquor, heating said waste liquor to a temperature of about 160° to about 170° C., continuing said heating until less than about 25% of said incrustation-forming components is precipitated, separating said heated liquor from said precipitated incrustation-forming components, transferring said heated liquor free from precipitated incrustation-forming components but containing at least 75% of the amount of said incrustation-forming originally present in said waste liquor to evaporators, and then concentrating said heated liquor without decomposition and without further precipitation of the incrustation-forming components present on the heat exchange surfaces of said evaporators whereby concentrated sulphite cellulose waste liquor is produced without reduction of the thermal efficiency of said evaporators through the formation of incrustations.

WILHELM GENSECKE.